United States Patent [19]

Shuman

[11] Patent Number: 4,786,025

[45] Date of Patent: Nov. 22, 1988

[54] ANTI-TWIST SIGNHOLDER SUPPORT ASSEMBLY

[75] Inventor: Bernard Shuman, Merrick, N.Y.

[73] Assignee: EEE Corporation d/b/a Eastern Display Products, Port Washington, N.Y.

[21] Appl. No.: 90,166

[22] Filed: Aug. 27, 1987

[51] Int. Cl.⁴ ........................................ F16M 13/00

[52] U.S. Cl. ........................................ 248/558; 24/107; 24/584; 40/606; 248/221.4; 248/1 R; 403/4

[58] Field of Search .............. 248/289.1, 221.4, 224.3, 248/916, 558, 535; 40/606; 403/4, 365, 406.1; 24/107, 108, 584, 585

[56] References Cited

U.S. PATENT DOCUMENTS

| | | | |
|---|---|---|---|
| 3,643,296 | 2/1972 | Kahn | 24/108 |
| 4,301,987 | 11/1981 | Conway | 248/221.4 |
| 4,347,013 | 8/1982 | Turner et al. | 403/4 |
| 4,586,688 | 5/1986 | Hartman et al. | 248/538 |
| 4,646,417 | 3/1987 | Esposito | 403/406.1 X |

*Primary Examiner*—Alvin C. Chin-Shue
*Assistant Examiner*—David L. Talbott
*Attorney, Agent, or Firm*—Henry Sternberg; Bert J. Lewen

[57] ABSTRACT

Anti-twist signholder support assembly, formed of a male insert, connectable to an overlying signholder, and having an upper horizontal multi-sided anti-twist plate, and a lower lock formation of diametrically arranged resilient catch fingers, and a mating female socket having a platform containing an upper horizontal multi-sided anti-twist recess of shape corresponding to plate and sized for receiving the plate, and a lower slot formation of arrangement and shape corresponding to the lock formation and sized for receiving the lock formation, such that the insert is alternatively coaxially insertable in the socket with the lock formation in the slot formation in more than one interchangeable relative angular rotational position, and such that in any alternative insertion position the recess will engage stationarily the plate for providing an anti-twist connection therebetween in which all external rotational forces about the axes acting on the insert will be transmitted directly by the plate to the recess remote from the lock formation and slot formation.

17 Claims, 2 Drawing Sheets

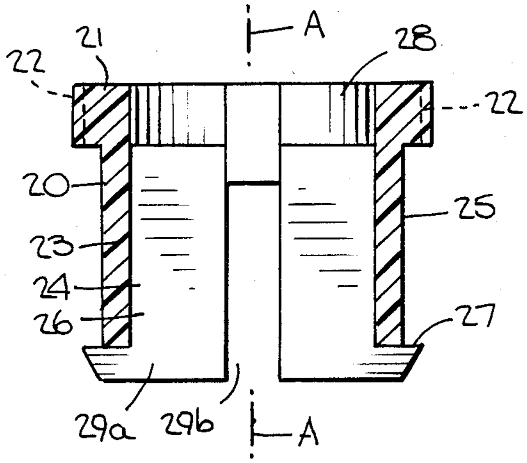
Fig. 4.
Fig. 5.
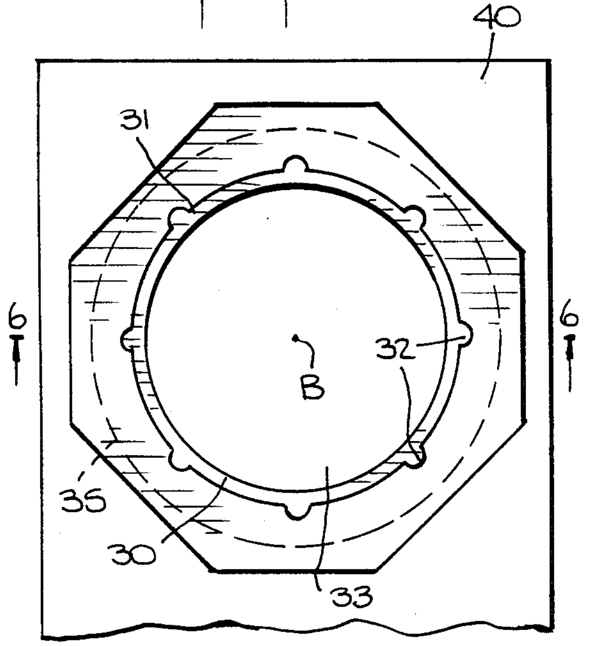
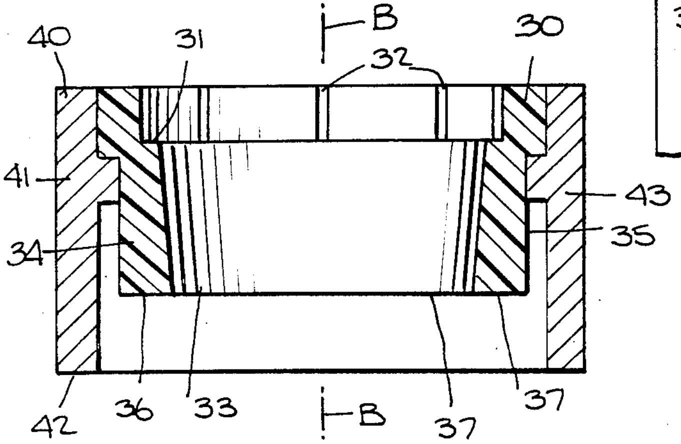
Fig. 6.
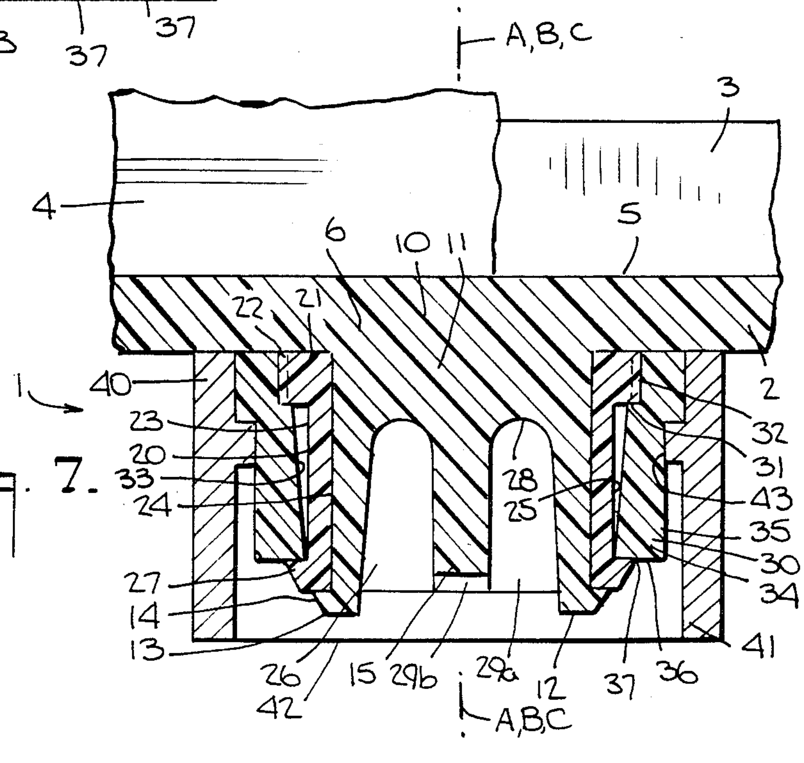
Fig. 7.

ANTI-TWIST SIGNHOLDER SUPPORT ASSEMBLY

FIELD AND BACKGROUND OF THE INVENTION

The present invention relates to an anti-twist signholder support assembly, and more particularly to a male attachment insert connectable to an overlying signholder and having a multi-sided anti-twist plate, and a mating female mounting socket for receiving and supporting the insert and having a corresponding multi-sided anti-twist recess, such that the insert is alternatively coaxially insertable in the socket in more than one relative angular rotational position, yet in any such position the recess will engage the plate for providing an anti-twist connection therebetween.

Signholder assemblies are known which are usable as merchandising aids to display indicia on cards, panels and the like type signs, and often include a signholder frame in which such an indicia containing sign is inserted, permitting the frame to be mounted in a convenient location of a consumer shopping area such as a retail store. The frame usually includes a male insert component which is inserted in a female mounting socket component attached to or forming a part of a stationary support.

One such known signholder assembly contemplates a cantilever type locking formation on the underside or lower portion of a vertical male insert, including a pair of diametrically opposed vertical, deflectable, i.e. springy, catch fingers, each having one end connected to the upper base portion of the insert that is connected to an overlying signholder frame and the other end disposed as a downwardly directed catch containing free end for locking engagement of the finger with a mating internal formation on the corresponding vertical female mounting socket.

However, in this known signholder assembly, while the insert is alternatively coaxially insertable in the socket in more than one interchangeable relative angular rotational position, for enabling the signholder frame to be placed at a corresponding desired angular rotational position, once the insert is in a given fixed angular position, any external rotational forces acting on the signholder frame, such as those which might occur upon unintentional or otherwise manual grasping or twisting of the sign, are transmitted more or less directly to the catch fingers locked in place in the socket in a given such inserted position. This arrangement renders the relatively delicate, normally plastic, catch fingers vulnerable to shearing or breaking off from the upper base portion of the insert, under the resultant twisting force transmitted thereto by the frame acting as a first class lever, and whose thrust is concentrated at the point of connection between the catch fingers and the upper base portion of the insert.

It would be desirable to provide a signholder support assembly of the contemplated general type, constructed so as to overcome any adverse effects of extraneous forces acting on the internal connection formation of such an insert when locked in place in a mating internal connection formation of a counterpart mounting socket, and specifically to prevent twisting and shearing off of any parts of the internal connection formation of the insert.

SUMMARY OF THE INVENTION

It is among the objects and advantages of the present invention to overcome the drawbacks and deficiencies of the prior art, and to provide an anti-twist signholder support assembly, which includes a male attachment insert alternatively insertable in a mating female mounting socket in more than one interchangeable relative angular rotational position, and which contains coacting formations for providing an anti-twist connection between the insert and socket, such that all external rotational, or twisting and shearing, forces acting on the insert will be transmitted directly via the anti-twist connection to the socket remote from the location of any internal locking formations that would otherwise be adversely affected by any such twisting and shearing forces.

It is among the additional objects and advantages of the present invention to provide an assembly of the foregoing type, which is relatively simple in design, inexpensive in construction, as well as robust and long wearing under normal conditions of service, and which can be made from commerically available materials in accordance with common fabricating technique.

According to the present invention, an anti-twist signholder support assembly is advantageously provided which comprises a male attachment insert and a mating female mounting socket, each having a central generally vertical anti-twist axis.

The insert is arranged for connection of an overlying signholder thereto, and includes an upper generally horizontal multi-sided, e.g. polygonal, anti-twist plate, such as one having a diametrically symmetrical confining perimetric horizontal shape, and a lower lock formation connected to the plate and including a pair of diametrically arranged, vertically extending and horizontally resilient catch fingers, each having one end connected to the plate and another end disposed as a catch containing free end.

The socket includes a platform portion containing an upper generally horizontal multi-sided, e.g. polygonal, anti-twist entrance recess having a confining perimetric shape corresponding to the shape of the plate and sized for receiving the plate, and a lower multiple slot formation extending from the recess and having a diametrical arrangement and shape corresponding to the arrangement and shape of the lock formation and sized for receiving the lock formation, and provided with an internal catch engaging edge formation for releasable locking of the horizontally resilient fingers thereat.

The arrangement of the assembly is such that the insert is alternatively coaxially insertable in the socket with the lock formation in the slot formation in more than one interchangeable relative angular rotational position, with respect to the axis, and such that in any alternative insertion position the perimetric confines of the recess will engage stationarily the perimetric confines of the plate for providing an anti-twist connection therebetween, in which all external rotational forces about the axis acting on the insert will be transmitted directly by the plate to the recess remote from the location of the lock formation and slot formation.

Desirably, the lock formation includes vertical appendages arranged in a diametrically symmetrical cruciform horizontal shape, and the fingers form a diametrically opposed pair of such appendages, and the slot formation includes vertical slots arranged in a corresponding diametrically symmetrical cruciform horizontal shape, and the slots are provided with the catch engaging edge formation.

More particularly, the lock formation further includes a vertical crosswall having one end connected to the plate and another end disposed as a free end, and the crosswall forms an intervening appendage between the fingers and together with the fingers defines such cruciform shape.

The insert is preferably integrally connected to such an overlying signholder.

The socket may be located in a mounting bracket support or other stationary support, and optionally may be provided in the form of a plug insertable in a hollow formation of such a support.

BRIEF DESCRIPTION OF THE DRAWINGS

Other and further objects and advantages of the present invention will become apparent from the within specification and accompanying drawings, in which:

FIGS. 2, 3 and 4 are side, end and bottom views, respectively, of the insert and a portion of the frame of the embodiment shown in FIG. 1;

FIG. 5 is a plan view of a portion of the support containing the socket, corresponding to the showing in FIG. 1;

FIG. 6 is a sectional view taken along the offset line 6—6 of FIG. 5; and FIG. 7 is a sectional view taken along the line 7—7 of FIG. 5, modified by the inclusion of corresponding partial portions in section of the insert and frame, according to the embodiment of FIG. 1.

DESCRIPTION OF THE PREFERRED EMBODIMENTS

Figure 1:
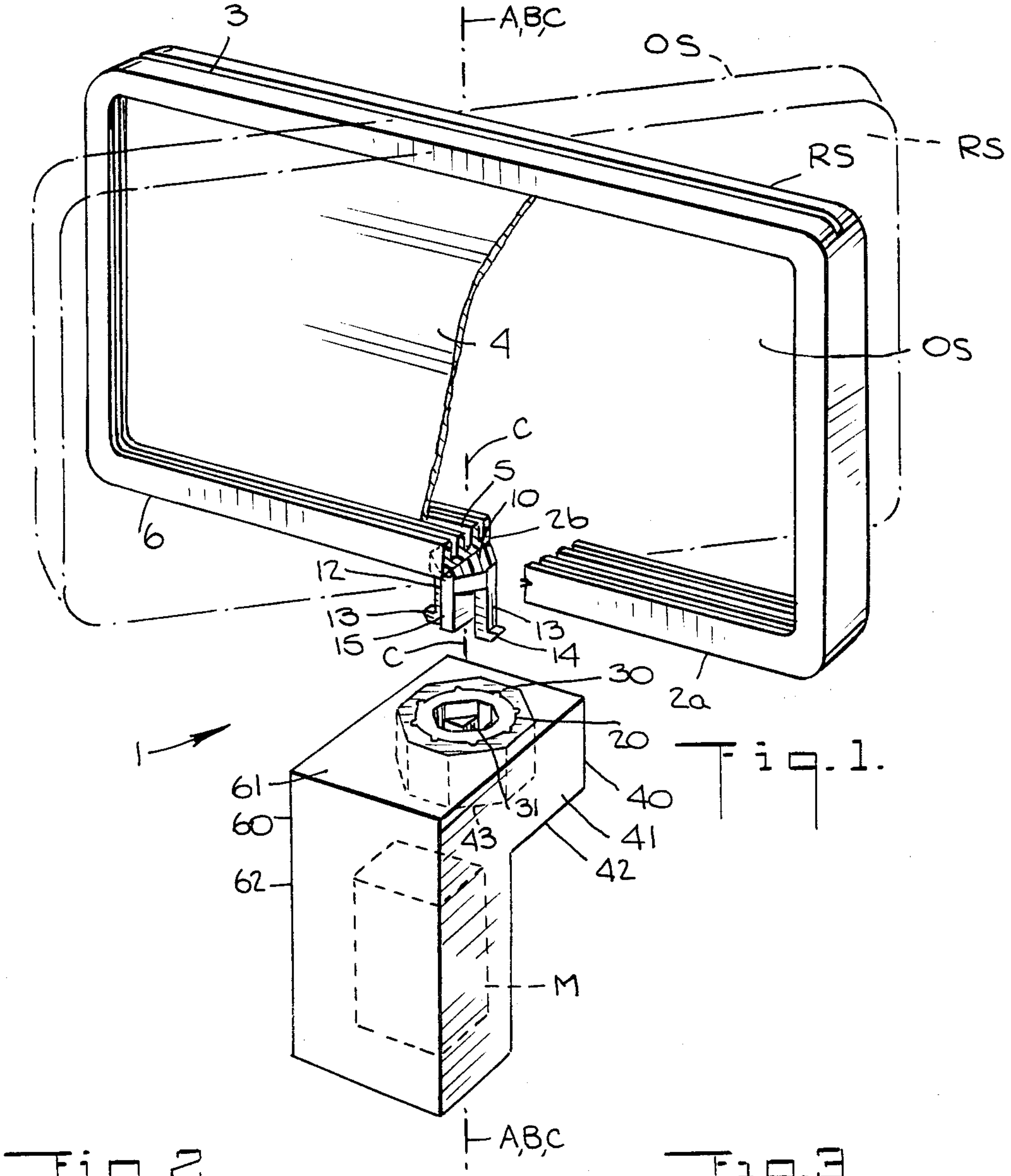
FIG. 1 is a schematic perspective veiw of a signholder support assembly according to one embodiment of the present invention, showing the male attachment insert integrally connected to an overlying signholder frame and alternatively insertable in different relative angular rotational positions, at 90 degree spaced apart intervals, into a mating female mounting socket contained in a stationary support, here shown in the form of a plug socket disposed in a hollow formation of an angle bracket support.

Referring to the drawings, and initially to FIG. 1, an anti-twist signholder support assembly 1 is shown, according to one embodiment of the present invention, including a vertical or upright signholder frame 2, e.g. made of plastic, having an internal slit 3 for inserting a sign 4, containing merchandising indicia or the like, to be held in the usual manner by an inside bottom blind groove 5 in frame 2. Frame 2 is integrally connected at its underside portion 6 to a vertical male attachment insert 7, e.g. also made of plastic.

Insert 7 is insertable in a vertical female mounting socket 30, e.g. made of plastic as well, which is located in a support 31. Support 31 may be made of plastic, metal or the like. When insert 7 is inserted in socket 30, these parts are coaxially arranged relative to their corresponding central generally vertical anti-twist axes A and B, shown in FIG. 1 as the common axis AB.

Figure 2:
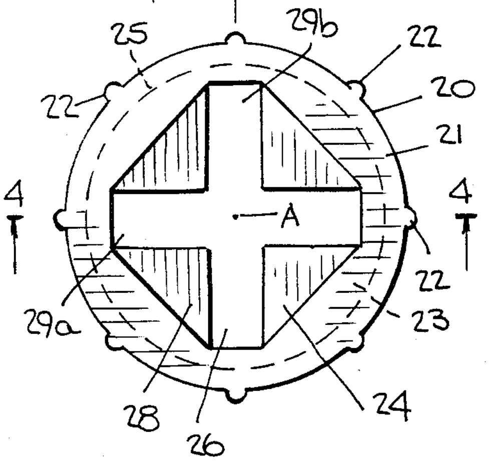
Figure 3:
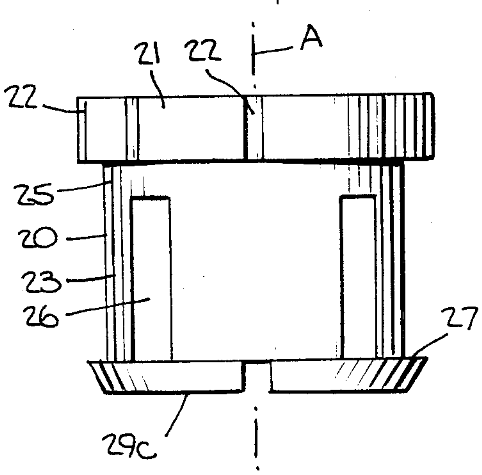

As is clear from FIGS. 2–4, insert 7 has the central vertical anti-twist axis A, and includes a base portion 8, e.g. integral with the adjacent margins of underside portion 6 of frame 2, and provided in the form of an upper generally horizontal multi-sided anti-twist plate 9, and further includes a lower lock formation 10 connected, e.g. integrally, to plate 9.

Plate 9 has a diametrically symmetrical confining perimetric horizontal shape such as a polygonal shape (FIG. 4), e.g. formed of four short (straight) sides 11 alternating with four long (angular) sides 12.

Lock formation 10 includes a pair of diametrically symmetrically arranged, vertically extending and horizontally resilient catch fingers 13, 14, each correspondingly having its upper end 15, 16 connected, e.g. integrally, to plate 9 and its lower end 17, 18 disposed as a free end and containing a resiliently engageable catch 19, 20. Lock formation 10 preferably further includes a vertical stabilizer crosswall 21 having its upper end 22 connected, e.g. integrally, to plate 9 and its lower end 23 disposed as a free end. For added structural support, fingers 13, 14 are correspondingly interconnected, e.g. integrally, by arched extensions 24, 25 at their upper ends 15, 16, to the adjacent portions of plate 9 and upper end 22 of crosswall 21 (FIG. 2).

As may be appreciated from FIGS. 2–4, lock formation 10 is in effect connected to plate 9 in downwardly depending cantilever fashion, and comprises a plurality of individual vertical cantilever appendages on the underside of plate 9, which are arranged in a diametrically symmetrical cruciform horizontal shape (FIG. 4). More specifically, fingers 13, 14 form a diametrically opposed spaced apart pair of such appendages, and crosswall 21 forms an intervening third appendage between fingers 13, 14, and together with fingers 13, 14 defines such cruciform shape.

As is clear from FIGS. 5–7, mating female mounting socket 30 on support 31 has the corresponding central generally vertical anti-twist axis B, and includes a platform portion 32 containing an upper generally horizontal multi-sided anti-twist entrance recess 33 connected, e.g. integrally, to platform portion 32, and a lower mutiple slot formation 34 extending downwardly or inwardly from recess 33.

Significantly, recess 33 has a diametrically symmetrical confining perimetric shape corresponding to the shape of plate 9, such as a polygonal shape (FIG. 5), and is sized for receiving plate 9 therein. Thus, like plate 9, recess 33 is formed of four short (straight) sides 35 alternating with four long (angular) sides 36.

Slot formation 34 has a diametrically symmetrical arrangement and shape corresponding to the arrangement and shape of lock formation 10, including fingers 13, 14, non-rotatably and is sized for receiving lock formation 10 therein and completely within the internal confines thereof. More specifically, slot formation 34 is formed of the openly communicating vertical cross slots 37, 38, of diametrically symmetrical cruciform horizontal shape (FIG. 5), such that one of the slots receives at each of its outer end portions a corresponding finger 13, 14, while the other of the slots receives crosswall 21 fully extending thereacross.

Slots 37, 38 extend inwardly or downwardly from recess 33 and terminate as a free standing horizontal continuous perimetric composite slot skirt provided with an internal catch engaging edge formation of lip 39 at the bottom of socket inner depending side wall 40 (FIG. 6), and thus disposed completely within the confines of the internal slot formation 34, for releasable self locking of catches 19, 20 of insert fingers 13, 14 thereat (FIG. 7). By providing support 31 as an internally hollow member, inner wall 40 of socket 30 may be suitably confined by an outer depending side wall 41 of support 31, terminating at a bottom peripheral edge 42, so as to form an open underside, thereby facilitating access to locked fingers 13, 14 via such open underside for the purpose of releasing resilient catches 19, 20 from engagement with catch engaging edge formation 39, either manually or with a simple probe like tool, to remove insert 70 from socket 30 (FIGS. 6 and 7), in the usual manner.

Because of the cruciform orientation of the various coacting parts of lock formation 10 and slot formation 34, insert 7 may be alternatively coaxially inserted in socket 30 with lock formation 10 and slot formation 34 in four different interchangeable relative angular rotational positions, i.e. with respect to one complete revolution about the anti-twist axis AB. These positions are at right angles to each other in view of the 90 degree angle of intersection between the common plane of fingers 13, 14 and the plane of crosswall 21, and the mating 90 degree angle of intersection between the plane of slot 37 and the plane of slot 38.

Thus, as shown in FIG. 1 and indicated in phantom in FIG. 5, when insert 7 is in one angular rotational position of insertion in socket 30, frame 2 which is connected to insert 7 in overlying relation thereto will extend either parallel to slot 38, as shown at *2a*, or perpendicular thereto, as shown at *2b*.

Nevertheless, since frame 2 has an obverse side OS and a reverse side RS, parallel position 2a represents two different or opposite parallel sub-positions of frame 2, one in which obverse side OS is presented to the viewer at a facing fixed circumferential point relative to axis AB, and the other in which reverse side RS is presented to the viewer at that point, these two parallel sub-positions being 180 degrees apart relative to axis AB.

Likewise, perpendicular position *2b* represents two different or opposite perpendicular sub-positions of frame 2, one in which obverse side OS is to the left and reverse side RS is to the right of the adjacent end edge of frame 2 as presented to the viewer at the same said point, and the other in which reverse side RS is to the left and obverse side OS is to the right of the opposite end edge of frame 2 as presented to the viewer at said point, these two perpendicular sub-positions also being 180 degrees apart relative to axis AB, as well as 90 degrees apart from the corresponding parallel sub-positions.

Advantageously, according to the present invention, in any such alternative insertion position, the perimetric confines of recess 33 will stationarily, or non-rotatably, embracively engage the perimetric confines of plate 9, for providing an effective anti-twist connection therebetween, in which all external rotational or twisting forces about axis AB acting on insert 7 will be transmitted directly by plate 9 to recess 33, and specifically remote from the location or level of lock formation 10 and slot formation 34.

Of course, it will be understood that the arrangement and shape of lock formation 10 and mating slot formation 34 may be provided so as to accommodate any number of individual alternative relative angular insertion positions of insert 7 in socket 30, as may be appropriate or desired.

Furthermore, as the artisan will appreciate, the plate and recess may have any desired particular multi-sided confining perimetric horizontal shape, and with sides of equal dimension or of alternating different dimension (see FIGS. 4–5), so long as the shape is diametrically symmetrical to permit alternative insertion of the insert in the socket in more than one interchangeable relative angular rotational position. Thus, the shape may be that of a triangle, square, pentagon, hexagon, or other polygon, or star, spur gear, or the like, but in the interests of simplicity will preferably be that of a polygon.

Heretofore, corresponding known signholder support assemblies of the type contemplating a male insert and female socket, utilized a construction of the insert lock formation in which any downwardly extending appendages such as cantilever catch fingers, with or without any stabilizer crosswalls, were directly connected to the upper base portion of the insert, in conjunction with a mating socket in which the slots of the slot formation extended upwardly to the upper platform portion.

Hence, in such known type assembly, any twisting forces encountered by the insert, e.g. via the frame, were transmitted directly by the upper base portion to the point of connection thereto of the upper ends of the catch fingers and of any included crosswall, and in turn were transmitted by such upper ends of the catch fingers and in any such crosswall to the rigidly embracing upper end portions of the socket slots. This construction rendered these cantilever appendages, especially the fingers, vulnerable to shearing off at their cantilever connection points to the upper base portion, and constituted a distinct drawback of such known construction.

In contrast thereto, by way of the present invention, provision is made for an anti-twist protective connection between the insert and socket which avoids completely any stress on the preferably plastic, generally fragile, springy cantilever appendages of the lock formation, by interposing a horizontal plate and entrance recess mating construction between the remainder of the insert and socket portions, which serves effectively to arrest locally thereat all external rotational forces about the anti-twist axis that act on the insert, by directing all such forces via the insert plate against the socket recess, while preserving the underlying merchandising function of the assembly, i.e. the ability of the assembly to accommodate a signholder frame in more than one interchangeable relative angular rotational position for display purposes.

It will be appreciated that frame 2 and insert 7 need not be integrally interconnected, but may instead constitute separate parts, in which case an attachment clip or the like of appropriate construction may be conveniently provided on one such part for releasably clipping the other part thereto, whereby to mount the frame detachably on the insert.

Although socket 30 may be integrally connected to support 31, it will be noted from FIGS. 1 and 6 that socket 30 may be favorably provided in the form of a plug, such as a tubular plug, non-rotatably insertable via its, e.g. polygonal, especially square or octagonal, peripheral side wall 43 in a hollow formation 44, e.g. in the form of a mating counterpart tubular, e.g. polygonal, especially square or octagonal, receiving wall portion, locked in support 31.

It will be understood that any other plug form of the socket may be provided for removable insertion in a corresponding mating type reception formation on the particular support.

It will be further noted from FIG. 1 that support 31 is conveniently constructed as an angle bracket 60, e.g. made of metal or plastic, and desirably equipped with an internal magnet. Thus, as shown in FIG. 1, angle bracket 60 has an upper horizontal arm 61 containing hollow formation 44 and a depending vertical arm 62, internally containing a magnet M, as shown in phantom. This enables the user to insert plug socket 30 in the hollow formation 44 of horizontal arm 61 and position bracket 60 against a magnetic metal horizontal corner portion of a merchandising display case or similar support in the well known manner.

Of course, the support containing the socket need not be in the form of an angle bracket, but instead may be of any desired construction, as the artisan will appreciate.

The insert, frame and socket, as well as the support for the socket, may each be made of plastic such as acrylonitrile-butadiene-styrene copolymer plastic (ABS), high impact polystyrene plastic (HIPS), and the like type materials. Alternatively, each of such parts may be made of metal. Furthermore, some of such parts may be made of plastic and others may be made of metal.

However, because of the facility and economy of fabricating such parts of plastic, e.g. by conventional injection molding technique, etc., plastic parts are generally preferred.

In all cases, the socket will be non-rotatably connected to the corresponding support, e.g. either integrally or by way of a non-rotatable plug socket connection with the mating hollow formation of the support in which it is removably received.

Regarding one example of pertinent dimensions for the insert and socket, based on FIGS. 4 and 5, the long dimension from one short side 11 to the opposite short side 11 may about one-half an inch, and the short dimension from one long side 12 to the opposite long side 12 may be about three eighths of an inch, thereby simultaneously defining the dimensions of plate 9 (cf. FIG. 4), with the same corresponding dimensions applying to the counterpart slots 37, 38 and recess 33 (cf. FIG. 5).

As to the frame, this may also be conveniently provided of any appropriate size, and in particular may be a simple transparent or clear plastic flat rectangular double walled panel frame 2 separated by an internal slit 3 terminating in a bottom blind groove 5 for holding a sign 4 containing indicia visible through each of the walls of the transparent double walled panel, as shown in FIG. 1, or may be a simple open perimetric frame having a top slit and an internal groove for receiving a double sided sign, or the like.

Favorably, the assembly is relatively small in size and generally light in weight. Nevertheless, the insert plate and socket recess arrangement must be constructed and provided to withstand gross twisting forces externally acting via the frame on the connection between the insert and socket, and not merely to withstand ordinary handling of the parts. This anti-twist protection is achieved effectively by the particular construction of the present invention.

It will be noted that the signholder or frame referred to herein is intended to embrace all types of merchandising items in which indicia may be displayed, regardless of the particular form or shape thereof, so long as the item is connected or connectable to an insert as contemplated herein.

Also, the terms "vertical" and "horizontal" are used hererin for convenience inorienting the positional relationships to one another of the pertinent parts of the assembly construction of the present invention, but are intended to apply to all spatial relationship angular positions, whether strictly horizontal, vertical or otherwise, since it is clear that signholder, frame, and the like type merchandising indicia displaying items may be positioned in any given spatial orientation, depending on the effect sought to be achieved thereby.

It will be appreciated that the foregoing specification and accompanying drawings are set forth by way of illustration and not limiting of the present invention, and that various modifications and changes may be made therein without departing from the spirit and scope of the present invention which is to be limited solely by the scope of the appended claims.

What is claimed is:

1. Anti-twist signholder support assembly, which comprises a male attachment insert arranged for connection of an overlying signholder thereto, and having a central generally vertical axis, and including an upper generally horizontal multi-sided anti-twist plate, and a lower lock formation integrally connected to the plate and including a pair of diametrically arranged, vertically extending and horizontally resilient catch fingers, each having one end integrally connected to the plate and another end disposed as a catch containing free end, and a mating female mounting socket having a central generally vertical axis, and including a platform portion containing an upper generally horizontal multi-sided anti-twist entrance recess having a perimetric shape corresponding to the shape of the plate and sized for receiving the plate non-rotatably therein, and a lower internal multiple slot formation extending from the recess and having a diametrical arrangement and shape corresponding to the arrangement and shape of the lock formation and sized for receiving the lock formation, including the horizontally resilient fingers, non-rotatably and completely within the lateral confines thereof, and provided with an internal catch engaging edge formation disposed completely within the lateral confines of the internal slot formation for releasable self locking of the horizontally resilient fingers thereat, the platform portion, recess and slot formation being integrally interconnected, such that the insert is alternatively coaxially insertable in the socket with the lock formation in the slot formation in more than one interchangeable relative angular rotational position, with respect to the axis, and such that in any alternative insertion position the recess will engage stationarily the plate for providing an anti-twist connection therebetween in which all external rotational forces about the axis acting on the insert will be transmitted directly by the plate to the recess remote from the lock formation and slot formation.

2. Assembly of claim 1 wherein the plate and recess are of corresponding polygonal shape.

3. Assembly of claim 1 wherein the lock formation includes vertical appendages arranged in a diametrically symmetrical cruciform horizontal shape, and the fingers form a diametrically opposed pair of such appendages, and the slot formation includes vertical slots arranged in a corresponding diametrically symmetrical cruciform horizontal shape, and the slots are provided with the catch engaging edge formation.

4. Assembly of claim 3 wherein lock formation further includes a vertical crosswall having one end connected to the plate and another end disposed as a free end, and the crosswall forms an intervening appendage between the fingers and together with the fingers defines such cruciform shape.

5. Assembly of claim 4 wherein the fingers are connected to the crosswall in the vicinity of their one ends which are connected to the plate.

6. Assembly of claim 4 wherein the plate and recess are of corresponding polygonal shape.

7. Assembly of claim 1 wherein the insert is made of plastic.

8. Assembly of claim 1 wherein the insert is integrally connected to an overlying signholder.

9. Assembly of claim 8 wherein the insert and signholder are made of plastic.

10. Assembly of claim 1 wherein the socket is made of plastic.

11. Assembly of claim 1 wherein the socket is in the form of a plug insertable in a hollow formation of a support.

12. Anti-twist signholder insert component, adapted for locking insertion in a mating mounting socket, which comprises a male attachment insert arranged for connection of an overlying signholder thereto, and having a central generally vertical axis, and including an upper generally horizontal multi-sided anti-twist plate, and a lower lock formation integrally connected to the plate and including a pair of diametrically arranged, vertically extending and horizontally resilient catch fingers, each having one end integrally connected to the plate and another end disposed as a catch containing free end, the plate and lock formation being adapted for coaxial insertion into a mating vertical integral female mounting socket including an upper generally horizontal multi-sided anti-twist entrance recess having a perimetric shape corresponding the shape of the plate and sized for receiving the plate non-rotatably therein, and a lower internal multiple slot formation inwardly of the recess and having a diametrical arrangement and shape corresponding to the arrangement and shape of the lock formation and sized for receiving the lock formation, including the horizontally resilient fingers, non-rotatably and completely within the lateral confines thereof, and provided with an internal catch engaging edge formation disposed completely within the lateral confines of the internal slot formation for releasable self locking of the horizontally resilient fingers thereat, the recess and slot formation being integrally interconnected, such that the insert is alternatively coaxially insertable in the socket with the lock formation in the slot formation in more than one interchangeable relative angular rotational position, with respect to the axis, and such that in any alternative insertion position the recess will engage stationarily the plate for providing an anti-twist connection therebetween in which all external rotational forces about the axis acting on the insert will be transmitted directly by the plate to the recess remote from the lock formation and slot formation.

13. Component of claim 12 wherein the plate is of polygonal shape adapted to be received in a socket recess of corresponding polygonal shape.

14. Component of claim 12 wherein the lock formation includes vertical appendages arranged in a diametrically symmetrical cruciform horizontal shape, and the fingers form a diametrically opposed pair of such appendages, the appendages being adapted to be received in a corresponding symmetrical cruciform horizontal shape socket slot formation.

15. Component of claim 14 wherein the lock formation further includes a vertical crosswall having one end connected to the plate and another end disposed as a free end, and the crosswall forms an intervening appendage between the fingers and together with the fingers defines such cruciform shape.

16. Component of claim 15 wherein the fingers are connected to the crosswall in the vicinity of their one ends which are connected to the plate.

17. Component of claim 12 wherein the insert is integrally connected to an overlying signholder.

* * * * *